June 29, 1926.
S. APOSTOLOFF
BATTERY CELL
Filed Oct. 10, 1918    2 Sheets-Sheet 1
1,590,715
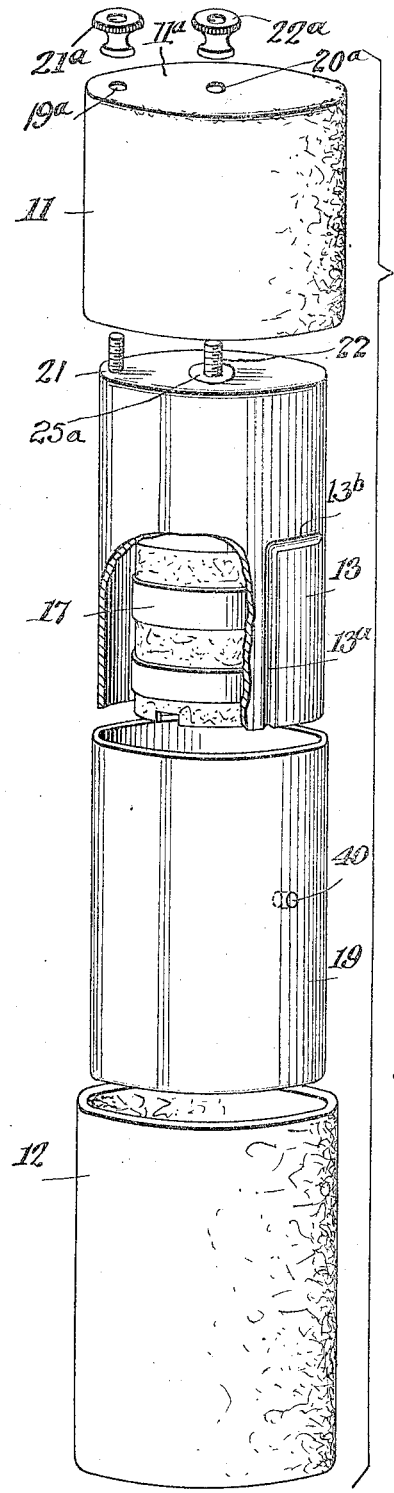
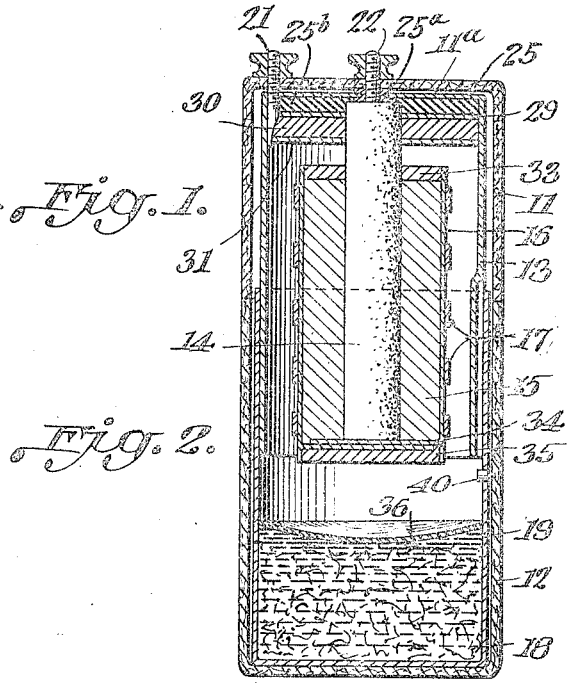
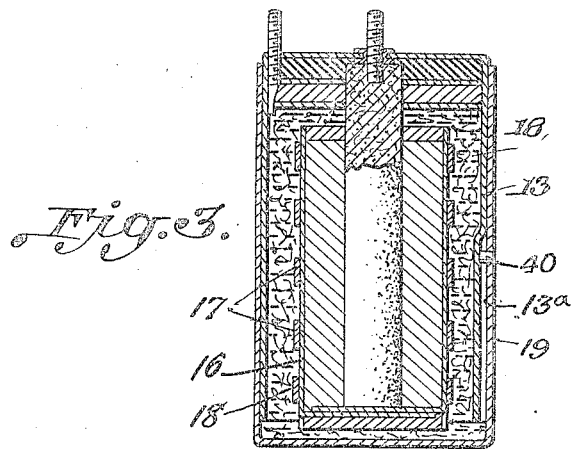
Inventor,
Serge Apostoloff.
By William Richards
Attorney.

June 29, 1926.

S. APOSTOLOFF

BATTERY CELL

Filed Oct. 10, 1918

Inventor
Serge Apostoloff,
By his Attorney

Patented June 29, 1926.

1,590,715

UNITED STATES PATENT OFFICE.

SERGE APOSTOLOFF, OF NEW YORK, N. Y., ASSIGNOR TO PORTABLE ELECTRIC CURRENT PATENTS CO., A CORPORATION OF DELAWARE.

BATTERY CELL.

Application filed October 10, 1918. Serial No. 257,651.

This invention relates to battery cells, and has for its object to construct such cells in such manner that no portion of their normal life will be wasted before they are put into use, and also so that they may, when desired, be put immediately into use, and at their full power.

A further object of this invention is to so form said cells that the positive and negative electrodes and the electrolytic salts will be positively isolated from each other during the period of the inaction of the cell, and so that they may, at the same time be thrown into instant electrical activity by a simple and quickly accomplished manipulation of the battery parts, and without the addition of water to the electrolytic salts, or the necessity of separating the electrode elements for the removal of parts.
A further object of my invention is to provide a new electrolytic mix, of a semisolid nature, that will retain its form when moulded, pressed, or otherwise formed into a desired shape or mass, until forcibly disturbed therefrom; that will retain its semisolid nature for an indefinite period of time until required for use, and that at the same time will possess a sufficient degree of fluidity to yield and flow freely upon force or pressure being applied to it.

A further object of my invention is to provide means for assembling the parts of my battery cell so that the same may be, at any time, and when necessary or desired, be disassembled and taken apart for cleansing, renewals, replacements, or recharging, and then be reassembled for use.

A further object of my invention is to provide positive means for holding and retaining the electrode elements of the cell isolated from each other during the period of inaction, and at the same time permit of immediate release and assemblage of parts whenever it is desired to put the cell into use.
These and other objects of my invention are set forth in the following specification and illustrated in the accompanying drawings, which form a material part of this disclosure, and in which:—
Figure 1 is a perspective view of a battery cell made in accordance with my invention, with the different members thereof spread out axially from assembled position;

Figure 2 is a central vertical sectional view showing the parts as assembled for sale or distribution;

Figure 3 is a similar view, showing the parts in the position assumed when the cell is ready for action, with the outer container removed;

Figure 4:
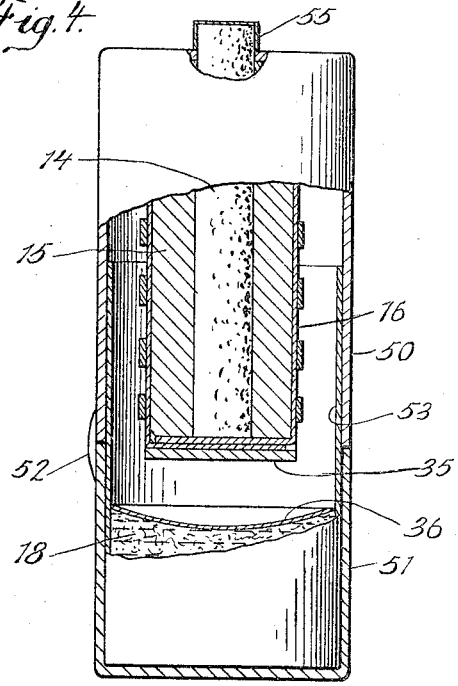
Figure 4 is a view partly in elevation and partly in axial vertical section, of a modified arrangement of the battery elements, with the parts in the same position as shown in Figure 2;
Figure 5:
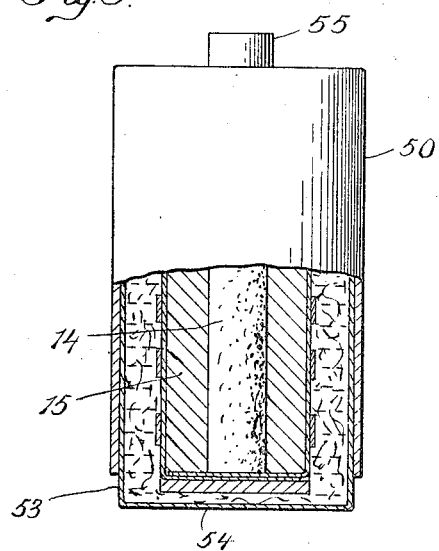
Figure 5 is a similar view of this modified arrangement with the parts closed up for use.

Heretofore dry battery cells have commonly been formed by one of two methods, either the battery cell has been completely made with the electrodes and active electrolytic salts in place, in which case electrical activity commences at once, or by the second method the cell is completely formed and assembled, but with dry electrolytic salts, so that the addition of a liquid is required before electrical activity sets up.

By the first method the useful life of the cell is shortened by the exact length of time it remains unused, and it frequently happens that it becomes exhausted and useless while on the shelves of dealers, or is practically exhausted and has but a short life when it comes into the hands of a user.

By the second method, according to the present existing practice, the filling of the cell with liquid is a long, tedious process, requiring continued attention and care, and requiring from $4\frac{1}{2}$ to $6\frac{1}{2}$ hours before the cell can develop its full power.

In a co-pending application herewith, Serial Number 250,974 filed August 22, 1918, renewed June 15, 1921, Ser. No. 477,865, and patented May 5, 1925, 1,537,023, I have shown and described a battery cell in which the electrode containers, one of which holds the electrolytic salts in a dry state, may be quickly separated for the addition of liquid to the electrolytic salts, and then be instantly assembled, the cell then immediately developing its maximum power, continuing to give energy until its elements become exhausted.

In my present invention I entirely avoid the necessity of separating the containers, and of adding liquids, my cells being substantially assembled ready for use, but I retain the electrodes and electrolytic salts isolated from each other until the moment when the cell is required for use, and at that moment release and assemble them, which may be done in a moment's time even by unskilled users, when the cell instantly becomes electrically active and attains its maximum power, and develops the usual energy for the full life of its elements.

In Figures 1, 2 and 3 of the drawings I have illustrated my invention as applied to the larger type of cells, that is to say cells of a size ranging from 6 inches in length and upwards, and which is here shown as having an outer container, comprising an upper portion 11 and bottom portion 12. This outer container may be formed of any suitable material, although where an inner zinc container, such as indicated at 19, is used I prefer to form the outer container of card board or the like.

The zinc electrode as shown at 13 is formed as a hollow tube without top or bottom and is of a size to fit snugly within the container 19. The part 13 will be hereinafter variously referred to as "tube", "tubular element", "tubular member", "sleeve", "shell-like electrode", "guiding element", "centering element", and "cup-shaped member". The part 19 will also be referred to as "cup-shaped member". The bobbin I prefer to use includes the carbon electrode 14, and the depolarizing mass 15, which according to my invention are enclosed in a wrapping of bibulous material 16, which in turn is contained within bands 17.

My electrolytic mix is formed in a semi-liquid state, of materials which include elements which render the mix non-drying, so that the mix will remain in whatever shape it is moulded, pressed or otherwise formed into, and at the same time possess a sufficient degree of fluidity to yield and flow freely upon sufficient force or pressure being applied to or upon it.

I prepare this mix from the usual salts at present in general use, which I dissolve in water, and then add an equal volume of powdered cellite or kieselguhr, and from 7½ to 11 per cent of its volume according to its strength, of agar-agar mixed or emulsified with one-tenth part, by weight, of either glycerine or still bottoms produced by the distillation of mineral or petroleum oils. If desired, the agar-agar can be substituted by starchy powder or wheat or other flour, but in this case the compound must be heated up to about 82 degrees centigrade, when the right consistency and properties are obtained.

The above described mix may be poured while still in a fluid state into the bottom of the inner container 19, or, when the latter is dispensed with, the mix is placed directly in the bottom of the outer container 12; which has been previously treated to render it sufficiently waterproof and rigid by usual and well known methods, the mix being indicated at 18 in the container. Within a short time this mix will stiffen or become semi-liquid and become sufficiently solid to preserve its form, softness and elasticity for an indefinite period of time, and yet be sufficiently liquid to easily give and flow when mechanical pressure is applied to it.

The bobbin with the carbon electrode 14, the depolarizing mass 15, and the zinc electrode 13, are supported while the cell is awaiting use; upon the top of the outer container 11, said top being provided with a cover portion $11^a$ firmly united to the side walls of said top. This cover portion is preferably provided with eyelets $19^a$, $20^a$, to respectively receive the screw-threaded contact posts 21, 22, the post 21 being soldered, or otherwise secured, to the zinc electrode, while the post 22 is secured to the carbon electrode, the nuts $21^a$ and $22^a$ serving not only as binding nuts but also to hold the bobbin and electrode 13 securely to the top $11^a$ of the container element 11.

The zinc electrode may have an integral member 25 extending across the top thereof, and having a central opening to receive an insulating bushing $25^a$ through which the stem 22 of the carbon electrode 14 extends freely.

Below this member 25 is a seal $25^b$ made of pitch or the like, this same resting upon a paper washer 29, covering a layer 30 of absorbent material such, for example as cellite or kieselguhr resting on another paper washer 31.

The zinc electrode may be tapered somewhat so that the above will be supported and held upon the inner walls thereof, or the above parts may be superimposed upon the wax layer 33 of the bobbin.

In order to maintain the depolarizing mass 15 insulated within the bibulous casing 16 I provide a washer-like layer 33 of wax at the upper end of the bobbin, while below the inturned bottom 34 formed with the casing, is a similar wax layer 35.

The electrolytic mass 18 is normally covered in the lower part of the container by means of a wax film 36 or other frangible material, adapted to remain in place until disrupted by force.

The zinc electrode 13 may be formed of a sheet of zinc rolled into a cylinder, and having a continuous groove formed in its outer wall comprising the longitudinal portion $13^a$, and transverse portion $13^b$, constituting an element resembling a bayonet joint.

A pin 40, is rigidly set in the bottom portion 12 of the outer container, and engages in the said groove. In assembling the cell the zinc electrode is inserted into the container bottom 12 with the pin in the portion 13$^a$ of the groove, and when the pin 40 has reached the transverse portion 13$^b$ the electrode is turned in a horizontal plane until said pin reaches the end of this transverse portion. In this position the zinc electrode cannot be withdrawn from the container without reversing the above movements, this being desirable to prevent accidental separation of the parts by careless or unskilled persons. This construction, however, allows of the electrode being pressed down into the container for use, as hereinafter more fully described, as the pin will ride up the portion 13$^a$ of the groove.

It will be obvious from the construction shown, that the zinc electrode 13 and the bobbin may be easily removed with the upper portion 11 of the outer container, when by removing the nuts 21$^a$, 22$^a$, the electrode and the bobbin may be separated for cleaning or renewals, while, with these parts removed, the zinc container and the mix may be withdrawn from the bottom 12 of the outer container for similar purposes, so that my battery cell permits of the renewal of all parts as desired, the interchangeability of parts, the cell is rechargeable at will, and the parts may be readily reassembled.

When the cell is to be used, the nuts 21$^a$ and 22$^a$ are loosened, the cap 11 removed, and the electrode 13 and the bobbin are pushed down into the electrolytic mass, the plasticity of which, or easy separability of the various particles whereof, permits of the mass being displaced and forced up into the space between the bobbin and the zinc electrode.

In the modification shown in Figure 4 I show a type of battery cell of small size such as is used in flash lights, or in tandem, the same being of similar construction in most respects to the cell shown in Figures 1, 2 and 3, but in this type of cells it is desirable that the bottom of the zinc electrode should form one contact point, while the carbon electrode is provided with a cap forming a fixed contact point.

In this type, therefore, I modify the above described construction as follows. Instead of forming the outer container with its bottom portion of a length sufficient to cover the outside of the zinc electrode when the cell is assembled for use, as I do in the first described type, I form the upper portion 50 of said container of such length, and provide a lower portion 51 of shorter length to serve as a bottom, the length of this latter portion being regulated so that it will, when the two portions of the container are in place and rest the one upon the other, hold with the bobbin secured to the upper portion the lower end of the bobbin away and isolated from the electrolytic mix. When the parts are in this position the two parts of the container may be sealed together as by one or more manufacturer's seals 52.

In this type of cell the zinc electrode 53 is in the form of an inner container whose bottom 54 which is adapted to act as a contact point, and the electrolytic mix is placed in the lower part of this electrode, which acts as a container therefor, and it should be understood that my invention broadly covers the placing of the mix either in an outer container as hereinbefore described, or in the zinc electrode provided with a bottom as here described. The end of the carbon electrode 14 is provided with a metallic cap 55, which acts as the other contact point.

When it is desired to use a cell so constructed it will only be necessary to break the manufacturer's seals and remove the bottom portion 51 of the outer container, when the lower portion of the zinc electrode may be pushed upwardly inside the portion 50 of the outer container, carrying the electrolytic mix with it, which is immediately forced around and into intimate contact with the bobbin so that electrical energy will be at once developed. It will be obvious that the relative lengths of the outer containers 11 and 12 may be reversed, and the container 12 removed when the cell shown in Figures 1 to 3 is to be used.

In the type of cell shown in Figure 4 it is only necessary to break the manufacturer's seal and remove the container bottom 51, when the zinc electrode may be forced up within the container 50, the bobbin displacing and causing the mix to flow in the same manner as above described.

In this type of cell a detent member may be formed with the zinc electrode (not shown) for engagement with the upper portion of the container to positively prevent said electrode from moving upward into said container until forcibly so moved, but as these parts will be constructed to closely fit each other, frictional contact between them will in most cases be sufficient to hold them in place.

It should be understood that my cells may be of the usual construction and form as to elements not included within my invention, and that the depolarizing mass employed is formed of the usual and well known component parts.

It will thus be seen that by my invention a battery cell is produced that remains entirely inactive during the period of non-use; that is always ready for use; whose life is not shortened during inaction; that can be put into use in a moment's time without adding to or removing anything from the battery elements, and without separation of the electrode members or their supporting means; that will develop its maximum activity immediately when put into use, and that will continue to give energy until its active elements are exhausted.

As will be noted, the member 36 forms a frangible partition separating the electrolytic mass from the electrodes, and should an electrolytic mass of a substantially non-cohesive nature be employed, this partition will serve to prevent premature or inadvertent contact between the electrodes and electrolytic mass. It will also be noted that my bobbin is held in spaced relation to the zinc container by the bushing 25$^a$, the seal 25$^b$, the absorbent material 30, and the washers 29, 31, and that the bands 17 are spaced apart from the zinc container a sufficient distance to permit the electrolytic mass to pass freely upward between said container and bobbin when the latter is pressed into the mass to displace the same, and that the quantity of said mass within the cell may be regulated as necessary or desired.

Having now described my invention what I claim as new and desire to secure by Letters Patent is:—

1. In a battery cell having electrode elements and an electrolytic mass, an outer container therefor, and means for supporting one of said electrode elements upon said container out of contact with said mass during cell inactivity.

2. In a battery cell having electrode elements and an electrolytic mass, a plurality of outer container elements for the cell, means for holding one of the electrode elements upon said container elements and out of contact with said mass during cell inactivity, and means for releasing the said electrode element last named to make contact with said mass when the cell is to be made active.

3. In a battery cell having electrode elements and an electrolytic mass, a plurality of outer separable container elements arranged end to end and adapted to hold one of the electrode elements out of contact with said mass during cell inactivity, means for attaching said last named electrode element to one of said container elements, and means for holding said parts together until manually released.

4. In a battery cell having a plurality of electrode elements and an electrolytic mass in contact with one of said electrode elements, a plurality of outer container elements arranged end to end and adapted to support the other of said electrode elements out of contact with said mass during cell inactivity and means which include a removable part of the container elements to release the last named electrode element to make contact with said mass.

5. A battery cell having a zinc electrode, and electrolytic mass disposed at the bottom thereof, a bobbin comprising the carbon electrode and depolarizer, means for supporting the last named electrode out of contact with said mass during the period of inaction of the cell, which include container elements arranged end to end and of a total length greater than the length of the completely assembled cell; said means being adapted to permit the said bobbin to be forced by direct pressure only into said mass to start the activity of the cell upon the removal of one of said elements.

6. A battery cell of the type described comprising an outer container, an electrode therewithin, a bobbin comprising the other electrode and depolarizer, an electrolytic mix, the entire mass of which is disposed in the bottom of said container below said bobbin, and means which include a removable element whereby said bobbin may be moved by pressure in a linear direction within said first named electrode and displace said mix and cause it to rise into electrical contact with said electrodes.

7. A battery cell of the type described comprising a two-part separable container, electrode elements suspended in one of said parts, an electrolytic mix disposed in the other of said parts below said elements, and means which include the removal of a portion of said container whereby said mix may be displaced and caused to rise into contact with said elements.

8. A battery cell comprising a container, an electrolytic mass in said container, a shell-like zinc electrode in said container, a bobbin supported by and wthin said zinc electrode, and a removable cover releasably supporting said zinc electrode and bobbin above and out of contact with said electrolytic mass.

9. A battery cell comprising a container, an electrolytic mass in said container, a shell-like zinc electrode in said container, a bobbin supported by and within said zinc electrode, and a removable cover releasably supporting said zinc electrode and bobbin above and out of contact with said electrolytic mass, and a frangible partition extending above said electrolytic mass.

10. In a dry cell of the type where the electrolyte is kept out of operative position until it is desired to put the cell into use, a container, a bobbin consisting of a carbon electrode and a depolarizing mass, and a tubular element surrounding the bobbin and connected thereto.

11. In a dry cell, a carbon and a zinc electrode, the zinc electrode being secured to the carbon electrode by a non-conducting material, a container, means in said container for rendering the battery active upon moving the container relative to the electrodes.

12. In a dry cell of the type where the electrolyte is kept out of operating position until it is desired to put the cell into use, a bobbin consisting of a carbon electrode and a depolarizing mass, a zinc cup, and a tubular element attached to said bobbin and acting as a centering means for said cup.

13. In a dry cell of the type adapted to remain inactive until it is desired to put the cell into use, a bobbin consisting of a carbon electrode, and a depolarizing mass, a sleeve surrounding and extending substantially the full length of said bobbin, a cup-shaped member, material in said cup-shaped member to render the battery active, and means on said sleeve for engaging the cup-shaped member and holding it and the bobbin in inactive position during cell inactivity.

14. In a dry cell of the type adapted to remain inactive until it is desired to put the cell into use, a bobbin consisting of a carbon electrode and a depolarizing mass, a sleeve surrounding said bobbin and attached thereto, a zinc cup, means for rendering the battery active upon moving the bobbin and the zinc cup relatively to each other.

15. In a dry cell adapted to remain inactive until it is desired to put the cell into use, two opposed telescoping cup-shaped members, one of said cup-shaped members carrying the carbon electrode, and means to render the cell active upon the telescoping of the cup-shaped members.

16. In a cell in combination, a negative electrode element, a positive electrode element, a mass of activating material normally maintained out of contact with the said electrodes, one of said electrodes being relatively movable with regard to the mass of activating material, said electrode upon being pressed against the inactive mass of activating material being adapted to displace and distribute the activating material in co-operative relation with both said electrodes.

17. In a dry cell battery, two telescopic containers, a depolarizing member carried by one of the containers, an electrolyte carried by the other container, and means to hold the electrolyte normally spaced from the depolarizing member and preserved from deterioration during the period of inaction of the battery, the electrolyte being forced into direct chemical contact with the depolarizing member as the result of the telescoping of the two containers.

18. In a dry cell battery, the combination of two containers carried normally in contact with each other but with their negative and positive elements spaced during the period of inaction of the battery, said elements being brought into active chemical contact by a simple act of forcing the containers one into the other.

19. A dry cell, including a pair of cups forming one of the elements of the same, a second element housed within said cups, an activating agent within one of said cups and being normally spaced from said second element, said cups being capable of being telescoped one with respect to the other, whereby to bring said activating agent into intimate contact with said elements, and means for preventing an accidental movement of one of said cups with respect to the other prior to said telescoping action.

20. A dry cell, including a pair of cups forming one of the elements of the same, a second element housed within said cups, an activating agent within one of said cups and being normally spaced from said second element, said cups being capable of being telescoped one with respect to the other, whereby to bring said activating agent into intimate contact with said elements, and means for preventing a movement of said cups one with respect to the other subsequent to said telescoping action taking effect.

21. A dry cell, including a pair of cups forming one of the elements of the same, one of said cups being formed with an opening through its base, an insulator positioned within said cup and adjacent to said base, an element, a terminal forming a part of said element, said element projecting through said insulator and base opening, and being spaced from the side edges of the latter.

22. A dry cell, including a pair of cups forming one of the elements of the same, a second element housed within said cups, an activating agent within one of said cups and being normally spaced from said second element, said cups being capable of telescoping one within the other, whereby to bring said activating agent into intimate contact with said element, one of said cups being formed with a stop, the second of said cups being formed with a shoulder, normally contacting with said stop, whereby to prevent any accidental telescoping action of one of the cups with respect to the other, said cups being capable of being moved to force said stop past said shoulder.

23. A dry cell, including a pair of cups forming one of the elements of the same, a second element housed within said cups, an activating agent within one of said cups and being normally spaced from said second element, said cups being capable of telescoping one within the other, whereby to bring said activating agent into intimate contact with said element, one of said cups being formed with a stop, the second of said cups being formed with a shoulder, normally contacting with said stop, whereby to prevent any accidental telescoping action of one of the cups with respect to the other, said cups being capable of being moved to force said stop past said shoulder, the first named cup being formed with a groove behind said stop, the shoulder of the second of said cups being adapted to seat within said groove upon being forced past said stop.

24. A dry cell of the kind described, comprising a hollow zinc electrode, a depolarizing mix therein spaced therefrom, a cup, means to retain the cup on the tube in two positions corresponding with the active and inactive conditions of the cell comprising a groove on one member and a cooperating boss on the other, a supply of activating material in the cup normally out of contact with the mix in one of said positions and adapted to be moved into contact therewith by longitudinal adjustment of the zinc and cup.

25. In a dry cell of the type described, two opposed telescoping cup-shaped members, one of said cup-shaped members comprising a zinc tube surrounding and connected to a bobbin, and the other of said cup-shaped members being composed of non-conducting material and containing electrolyte paste.

26. In a dry cell adapted to remain inactive until it is desired to put into use, two telescoping tubular members, one of said members consisting of non-conducting material and being open at the top, the other of said members comprising an electrode and being open at the bottom.

In testimony whereof, I have signed my name to this specification, this 24th day of September, 1918.

SERGE APOSTOLOFF.